US008808411B2

(12) United States Patent  (10) Patent No.: US 8,808,411 B2
Collins et al.  (45) Date of Patent: Aug. 19, 2014

(54) GASEOUS TRANSFER IN MULTIPLE METAL BATH REACTORS

(71) Applicants: Michael C. Collins, The Woodlands, TX (US); Robert D. Bach, Marco Island, FL (US)

(72) Inventors: Michael C. Collins, The Woodlands, TX (US); Robert D. Bach, Marco Island, FL (US)

(*) Notice: Subject to any disclaimer, the term of this patent is extended or adjusted under 35 U.S.C. 154(b) by 0 days.

(21) Appl. No.: 13/627,247

(22) Filed: Sep. 26, 2012

(65) Prior Publication Data

US 2013/0228721 A1  Sep. 5, 2013

Related U.S. Application Data

(63) Continuation of application No. 12/363,398, filed on Jan. 30, 2009, now Pat. No. 8,303,916.

(60) Provisional application No. 61/025,684, filed on Feb. 1, 2008.

(51) Int. Cl.
*B01J 7/00* (2006.01)

(52) U.S. Cl.
USPC .......... 48/61; 48/127.9; 48/127.1; 48/92; 48/198.2; 48/212; 48/210; 48/127.5; 48/200; 48/203; 48/76; 48/197 R; 48/71; 48/72; 48/73

(58) Field of Classification Search
USPC ............ 48/61, 127.9, 127.1, 92, 198.2, 212, 48/210, 127.5, 200, 203, 76
See application file for complete search history.

(56) References Cited

U.S. PATENT DOCUMENTS

| | | | | | |
|---|---|---|---|---|---|
| 438,246 | A | * | 10/1890 | Silver | 428/55 |
| 2,647,045 | A | * | 7/1953 | Rummel | 48/206 |
| 3,700,584 | A | * | 10/1972 | Johanson et al. | 208/408 |
| 3,821,362 | A | * | 6/1974 | Spacil | 423/657 |
| 4,043,766 | A | * | 8/1977 | Gernhardt et al. | 48/73 |
| 4,187,672 | A | * | 2/1980 | Rasor | 60/39.12 |
| 4,244,180 | A | * | 1/1981 | Rasor | 60/774 |
| 4,343,624 | A | * | 8/1982 | Belke et al. | 48/61 |
| 4,345,990 | A | * | 8/1982 | Fahlstrom et al. | 208/404 |
| 4,388,084 | A | * | 6/1983 | Okane et al. | 48/197 R |
| 4,431,612 | A | * | 2/1984 | Bell et al. | 422/186.21 |
| 4,574,714 | A | * | 3/1986 | Bach et al. | 588/314 |
| 4,602,574 | A | * | 7/1986 | Bach et al. | 588/314 |
| 4,681,599 | A | * | 7/1987 | Obkircher | 48/92 |
| 5,322,547 | A | * | 6/1994 | Nagel et al. | 75/414 |
| 5,358,549 | A | * | 10/1994 | Nagel et al. | 75/414 |
| 5,645,615 | A | * | 7/1997 | Malone et al. | 48/92 |
| 5,744,117 | A | * | 4/1998 | Wilkinson et al. | 423/563 |
| 5,755,839 | A | * | 5/1998 | Malone | 48/92 |
| 5,858,486 | A | * | 1/1999 | Metter et al. | 428/34.1 |
| 5,984,985 | A | * | 11/1999 | Malone | 48/25 |
| 6,110,239 | A | * | 8/2000 | Malone et al. | 48/198.2 |
| 6,200,522 | B1 | * | 3/2001 | Satchell, Jr. | 266/197 |
| 6,350,289 | B1 | * | 2/2002 | Holcombe et al. | 48/197 R |
| 6,663,681 | B2 | * | 12/2003 | Kindig et al. | 48/127.5 |

(Continued)

*Primary Examiner* — Kaity Handal

(57) ABSTRACT

Disclosed is a process for making a high-purity gas. The process includes an interrelationship among at least four bath vessels, each of which has a molten metal bath. In one embodiment, the process generally includes adding a gas stream into a first bath vessel and then removing that gas stream to introduce it into a third bath vessel. The third bath gas stream is removed to ultimately obtain hydrogen. Steam is added to a fourth bath vessel to ultimately produce additional hydrogen. One or more gas streams produced in the third and/or fourth bath vessels are added to a second bath vessel to ultimately result in production of methane or carbon monoxide.

18 Claims, 4 Drawing Sheets

(56) References Cited

U.S. PATENT DOCUMENTS

| | | | |
|---|---|---|---|
| 6,682,714 B2* | 1/2004 | Kindig et al. | 423/657 |
| 6,685,754 B2* | 2/2004 | Kindig et al. | 48/210 |
| 6,790,430 B1* | 9/2004 | Lackner et al. | 423/648.1 |
| 7,335,320 B2* | 2/2008 | Kindig et al. | 252/373 |
| 7,767,191 B2* | 8/2010 | Thomas et al. | 423/658 |
| 8,303,916 B2* | 11/2012 | Collins et al. | 422/600 |
| 2002/0124466 A1* | 9/2002 | Kindig et al. | 48/127.3 |
| 2006/0228294 A1* | 10/2006 | Davis et al. | 423/659 |

* cited by examiner

GASEOUS TRANSFER IN MULTIPLE METAL BATH REACTORS

RELATED APPLICATIONS

This application is a divisional application of U.S. Pat. No. 8,303,916, filed Jan. 30, 2009, which claims the benefit to U.S. Provisional Patent Application No. 61/025,684, filed on Feb. 1, 2008. The entire teachings of the above-referenced applications are incorporated herein by this reference.

FIELD OF THE INVENTION

The present invention describes a method for the production of high purity, high pressure gas streams comprising methane ($CH_4$), syngas ($CO/H_2$) and hydrogen ($H_2$). The method advantageously can be used to produce large volumes of these gaseous products at a lower cost than currently now available by prior art methods. The methane gas stream can be used as a fuel or energy source and/or as a building block to produce a number of higher molecular weight hydrocarbons. The hydrogen gas can be used in a variety of applications including but not limited to the reduction of carbon dissolved in liquid metals, $H_2$ storage in fuel cells, and hydrogenation reactions. In one embodiment, the syngas ($CO/H_2$) can be delivered in a 1:1 ratio under high pressure and high purity for use in very diverse chemical transformations such as the Fischer-Tropsch reaction.

BACKGROUND OF THE INVENTION

It is now well established that there is a worldwide energy shortage and particular emphasis has been placed upon new technologies for the conversion of our naturally abundant resources such as coal to more broadly useful gaseous materials such as syngas ($CO/H_2$), hydrogen ($H_2$), methane ($CH_4$) and other low molecular weight hydrocarbons. Additionally, the economical production of natural gas and high-value energy sources that can be used in place of natural gas has become an economic necessity. Natural gas has a composition that includes about 80-85 percent methane ($CH_4$), about 10 percent ethane ($C_2H_6$) with varying percentages of higher hydrocarbons including propane ($C_3H_8$) and butane ($C_4H_{10}$). The primary component of natural gas, methane, has a heating value of about 23,875 Btu/lb.

There are particular advantages to natural gas and other high BTU gas compositions being produced on site and utilized in such energy consuming applications as the production of electricity. Although the combustion of coal to generate steam, can be used to generate electricity, coal deposits frequently contain high levels of impurities such as sulfur and mercury and consequently must be subjected to expensive processing prior to utilization. Thus, the direct conversion of the carbon in the coal to a hydrocarbon product of high purity, such as methane gas, remains a highly desirable objective. Many processes currently available have not proven to be economic. New processes that are both highly economical and ecologically sound must be developed to satisfy current energy and raw material demands that can potentially use low-grade coal sources.

In marked contrast to coal gasification, incineration typically involves a combination of pyrolysis (1200° C.) and combustion that is initiated by a high temperature flame. At such high temperatures, pyrolysis transforms organic compounds into a more oxidizable form, but the oxidation step requires the actual collision of the resulting: incipient high-energy carbonaceous fragments with oxygen. Lack of efficient mixing on a molecular level impedes the rate of oxidation. Alternatively, more modern methods of coal gasification are initiated at high temperatures but the coat is injected into hot molten metal baths for the purpose of thermal decomposition into molecular fragments followed by certain other chemical transformations of the atomic carbon into usable gaseous species.

In Rummel's U.S. Pat. No. 2,647,045, for example, a molten slag bath obtained from the reduction of iron ore or from the "non-combustible residues of coal products" is circulated and finally divided coal is injected into the bath and a separate addition of air is also conducted along: with "an endothermic gaseous reactant", e.g. water and $CO_2$. U.S. Pat. No. 3,700,584 by Johanson treats low quality coal having a high oxygen content in a gasification process converting the coal to a useful hydrocarbon product.

An iron bath is used for coal gasification in U.S. Pat. No. 4,388,084. In U.S. Pat. No. 4,389,246 issued to Okamura et al., on the subject of coal gasification employing a molten iron bath, the bottom-blowing of ethane is described. The ethane or other hydrocarbon gas is used to stir the mixture and is considered by Okamura et. al. to be equivalent to oxidizing gases. Injection from above is employed in Gernhardt et. al., U.S. Pat. No. 4,043,766; Okamura et. al. U.S. Pat. No. 4,389,246; Okane et. al. U.S. Pat. No. 4,388,084; and Bell et. al, U.S. Pat. No. 4,431,612.

Other processes for producing synthesis gas from steam and carbon have been disclosed. For example, U.S. Pat. No. 1,592,861 by Leonarz describes a method for the production of water gas by contacting steam with uncombined carbon in a bath of molten metal. The steam is dissociated into its respective elements at temperatures of 900° C. to 1200° C. The carbon combined with the oxygen of the gas is sufficient in quantity to produce carbon monoxide but not to make an appreciable quantity of carbon dioxide.

Molten iron is employed by Rasor in U.S. Pat. Nos. 4,187,672 and 4,244,180 as a solvent, for carbon generated through the topside introduction of coal; the carbon is then partially oxidized by iron oxide during a long residence time and partially through the introduction of oxygen from above. For example, raw coal can be gasified in a molten metal bath such as molten iron at temperatures of 1200° C. to 1700° C. Steam is injected to react with the carbon endothermically and moderate the reaction. The Rasor disclosure maintains distinct carbonization and oxidation chambers.

Bach et. al. in U.S. Pat. Nos. 4,574,714 and 4,602,574 describe a process for the destruction of organic wastes by injecting them, together with oxygen, into a metal or slag bath such as is utilized in a steelmaking facility. Nagel et. al. in U.S. Pat. Nos. 5,322,547 and 5,358,549 describe directing an organic waste into a molten metal bath, including a first reducing agent which chemically reduces a metal of the metal-containing component to form a dissolved intermediate. A second reducing agent is directed into the molten metal bath. The second reducing agent, under the operations of the molten metal bath, chemically reduces the metal of the dissolved intermediate, thereby, indirectly chemically reducing the metal component of the waste.

Hydrogen gas ($H_2$) can be produced from feedstocks such as natural gas, biomass and water (steam) using a number of different technique. No. 4,388,084 by Okane et al. discloses a process for the gasification of coal by injecting coal, oxygen and steam onto molten iron at a temperature of about 1500° C. The manufacture of hydrogen by the reduction of steam using an oxidizable metal species is also known. For example, U.S. Pat. No. 4,343,624 by Belke et. al., discloses a three-stage hydrogen production method and apparatus utilizing a steam oxidation process. U.S. Pat. No. 5,645,615 by Malone et al. discloses a method for decomposing carbon and hydrogen containing feeds, such as coal, by injecting the feed into a molten metal using a submerged lance. Malone et. al. in U.S. Pat. No. 6,110,239 describe a hydrocarbon gasification process producing hydrogen-rich and carbon monoxide-rich gas streams operating at pressures above 5 atmospheres where the molten metal is transferred to different zones within the same reactor effected by vertical baffles for the purpose of modulating carbon concentrations.

The method of Kindig et. al. in U.S. Pat. Nos. 6,682,714; 6,685,754 and 6,663,681 describes the production of hydrogen gas, formed by steam reduction using a metal/metal oxide couple to separate oxygen from $H_2O$. The method utilizes one of the fundamental operations of Nagel et. al., U.S. Pat. No. 5,358,549 that reduces a dissolved metal oxide with a carbon source such as CO or coal. Steam is contacted with a molten metal mixture including a first reactive metal such as iron dissolved in a diluent metal such as tin. The reactive metal oxidizes to a metal oxide, forming a hydrogen gas and the metal oxide can then be reduced back to the metal for further production of $H_2$ without substantial movement of the metal or metal oxide to a second reactor. It is suggested that preventing the physical movement of such nongaseous materials such as Fe and FeO, on a commercially useful scale involving several hundred tons of material, may reduce the cost associated with the production of hydrogen gas. Kindig et. al. (U.S. Pat. No. 7,335,320) produces a hydrogen-containing synthesis gas ($H_2$:CO) in a 1:1 molar ratio using several hundred tons of material without the need to remove carbon oxides from the gas stream.

A number of metal/metal oxide systems have been used in addition to iron/iron oxide. For example, U.S. Pat. No. 3,821,362 by Spacil illustrates the use of $Sn/SnO_2$ to form hydrogen. Molten tin is atomized and contacted with steam to form $SnO_2$ and $H_2$; the $SnO_2$ is reduced back to liquid tin.

Davis et. al. in U.S. Publication. No. 20060228294 (European Patent EP1874453) have described a process and apparatus for treating organic and inorganic waste materials in a high temperature metal bath reactor to produce syngas by the reaction of steam with iron metal. However, this process requires injecting oxygen, steam and/or co-feeding one or more additional feed materials of higher heat value in order to maintain a balanced production of syngas.

In spite of the above mentioned processes, however, a more efficient method of producing syngas at high pressure and high temperature remains a desirable goal.

SUMMARY OF THE INVENTION

In one embodiment, the invention relates to a reactor system capable of withstanding high temperatures and high pressures. The reactor system can possess one or more reactive chambers and can be used in processes entailing one or more steps.

In one embodiment, the process includes injection of a hydrocarbon feedstock, such as coal, into a first, high temperature liquid metal bath (such as a chamber of a reactor described herein), thereby providing an opportunity for specific chemical operations that provide valuable products such as methane ($CH_4$), syngas (CO/$H_2$), $H_2$, CO and higher hydrocarbons under pressures up to 200 bar or more and/or purities of 99% or more by weight. The off gases produced in this first bath, such as CO, $CO_2$, $H_2S$, $H_2$ and $N_2$, can be transferred to a secondary molten metal bath (e.g., in the same or different reactor) and can be further processed. Impurities can be removed as slag or in gaseous form in the lower bath. Reduction chemistry can take place in another metal bath, such as a conjoined upper bath. Carbon dissolved in the first, or primary, metal bath, may be transferred (e.g., vertically or horizontally, for example, under a pressure differential or by mechanical means), to a second, preferably upper, bath for a reduction reaction, such as reduction of carbon to produce purified methane, or water to produce CO and/or $H_2$ under high pressure. Metal transfer rates between conjoined baths can be controlled by releasing or building pressure using the exit gas control valves and or by adjusting feedstock injection rates. Oxidation of the metal in a metal oxide-rich adjoining upper liquid metal bath, free from impurities, with steam, provides a pure high pressure stream of syngas in a stoichiometric 1:1 ratio (CO/H2). This multiple conjoined metal bath technology can remediate a variety of different hydrocarbon materials affording high purity, high pressure gaseous products in addition to saleable byproducts including but not limited to $H_2SO_4$ and $CO_2$.

One preferred embodiment of the present invention describes a process in which high-purity, and optionally, high-pressure syngas (CO/$H_2$) or $H_2$ gas streams and/or a high-purity, high-pressure "carbon containing" gas stream are alternatively, independently and/or simultaneously produced separately and, preferably, continuously from a molten metal bath that contains multiple zones. The term "high-purity" syngas or $H_2$ gas means a gas stream that contains at least about 99% by weight CO and/or $H_2$, preferably at least about 99.5%. Purity levels of about 99.9% by weight have been achieved in accordance with the inventions described herein. The term "high-purity" carbon-containing gas stream means a gas stream that contains at least about 99% by weight carbon containing compounds, e.g., hydrocarbons (preferably methane, and/or other $C_1$-$C_4$ hydrocarbons), and preferably at least about 99.5% by weight carbon containing compounds, e.g., preferably at least about 99.5% by weight methane. Again, purities of about 99.9% methane by weight can be achieved.

The gaseous streams produced by the processes described herein can be obtained at high pressure. Of course, the pressure of the gas can be reduced or, alternatively, the pressure can be further increased or the stream can be liquefied. The term "high-pressure" syngas or $H_2$ gas, when referring to the gas stream exiting the process, means a gas stream that has a pressure of at least about 1 bar, preferably at least about 10 bar, or most preferably at least about 100 bar. The reactor can preferably accommodate pressures of up to about 600 bar, such as between about 150 bar and 200 bar.

DETAILED DESCRIPTION OF THE INVENTION

Figure 1:
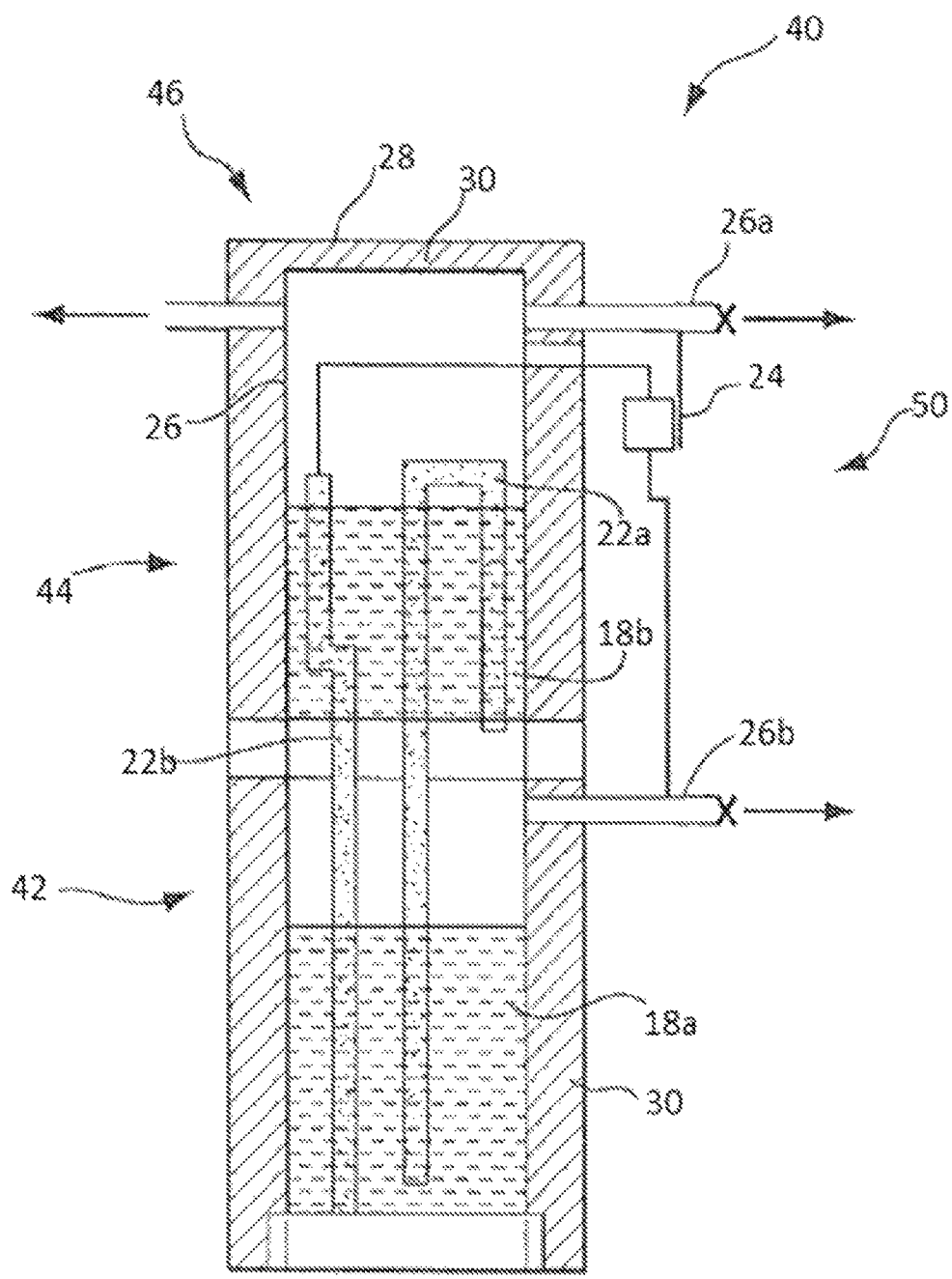
FIG. 1 is a conceptual view of an example of a metal bath reactor of the present invention.

The features and other details of the method of the invention will now be more particularly described with reference to the accompanying FIG. 3 and pointed out in the claims. It will be understood that particular embodiments of the invention are shown by way of illustration and not as limitations of the invention. The principal features of this invention can be employed in various embodiments without departing from the scope of the invention.

In one embodiment, the invention relates to a reactor system capable of withstanding high temperatures and high pressures comprising:
  a. a first bath vessel capable of containing a bath having a bath temperature, T1, and a bath vessel pressure, P1; and
  b. a reactor housing characterized by a housing temperature, T10,
wherein the first bath vessel is contained within the housing and having a gas zone having a gas zone pressure, P10, disposed therebetween and wherein P10 approximately the same as P1 and T10 is less than T1. More than one bath vessel (e.g., two, three, four or more) can be included within one, two or more reactor housings.

In another embodiment, the invention includes a reactor system comprising:
  a. a first bath vessel capable of containing a metal bath having a bath temperature, T1 and a bath pressure P1;
  b. a second bath vessel capable of containing a bath having a bath temperature, T2 and a bath vessel pressure P2 disposed above said first bath vessel;
  c. a first conduit in fluid communication with the first bath vessel and second bath vessel, whereby the pressure difference between P2 and P1 causes transfer of a liquid residing in said first bath vessel to said second bath vessel; and
  d. a second conduit in fluid communication with the first bath vessel and second bath vessel, whereby gravity causes transfer of a liquid metal residing in said second bath vessel to said first bath vessel.

The bath vessels of molten metal reactors, including but not limited to the reactors described herein, contain a molten metal bath, as described in more detail below. Generally, the molten metal bath contains a reactive species, such as iron/iron oxides and/or nickel. The reactive species, such as iron, can be added and maintained as a solid, e.g., iron filings and need not be molten per se. It has been found that the density of the molten metal bath can be advantageously approximated to the density of the reactive species, thereby retaining the solid reactive species in substantial suspension. This can be achieved by optimizing the alloy components of the bath and temperature and hence the melting point of the bath. Maintaining the reactive species in suspension permits lower reaction temperatures, improves reaction times, and avoids loss due to layering.

Bath temperatures (T1, T2, T3 T4, etc.) are generally greater than about 200 F and are preferably greater than about 500 F and can be up to about 1000 F or about 3000 F or more. The reactor housing temperatures, on the other hand, are generally substantially less than the bath vessel temperatures and can be between room temperature (or below) and about 500 F. The difference in the bath temperature(s) and housing temperature(s) can be, for example, at least about 100 F, preferably at least about 200 F and more preferably greater than about 300 F.

Bath vessel pressures are substantially the same as the gas zone pressures surrounding the bath vessel. The pressures are considered to be substantially the same if the pressures are within about 10%, for example within about 5%. Preferably, the gas zone pressure is slightly greater (e.g., about 1%) than the bath vessel pressures. The bath vessel pressures are preferably at least about 1 bar, e.g., greater than 5 bar, such as greater than about 10 bar or about 100 bar. Pressures of 600 bar or more can be achieved. Preferably, the bath vessel pressures are between about 150 and 200 bar.

The gas zone within the reactor housing enclosing the bath vessel is preferably filled with a gas, such as an inert gas. Suitable gases include air, carbon dioxide and argon. Carbon dioxide is preferred. Argon can be used when it is important to use an inert gas (e.g., the reactor housing is equipped with induction coils). The gas can be chosen to provide good insulation properties.

Each bath vessel is preferably made of a material that can withstand a molten metal bath and, preferably, has a tensile strength of at least 50,000 psi, preferably at least about 100,000 psi. For example, a 5 inch thick stainless steel vessel or a graphite vessel can be used. The vessel can be optionally lined with a refractory material, as appropriate.

The reactor system can optionally comprise a second or third or more bath vessel within each housing. In one embodiment, the second bath vessel is disposed vertically above the first bath vessel, although a horizontal arrangement of the vessels is possible as well. Where the bath vessels are arranged vertically, the vessels can be separated by a plate, such as a stainless steel plate coupled to the reactor housing. The vessels are preferably sealed, e.g. with a compression seal, by the plate.

The liquid baths of at least two vessels are preferably in liquid communication. In one embodiment, the bath vessel pressure in the second (or upper) bath vessel, P2, is lower than bath vessel pressure of the first, or lower, bath vessel, P1. This provides a pressure differential that can lift or transport the liquid in the lower bath to the upper bath without the assistance of mechanical means. Of course, the transfer of liquid between bath vessels can be achieved, or assisted, mechanically as well.

In this embodiment, the reactor system further comprising a first conduit in fluid communication with the second bath vessel and first bath vessel, whereby the pressure difference between P1 and P2 causes transfer of a molten metal residing in said first bath vessel to said second bath vessel. The first conduit preferably comprises an inlet disposed in the lower half of the first bath vessel and an outlet disposed in the upper half of the second bath vessel. Preferably, the first conduit comprises a first valve to control molten metal transfer.

The reactor system alternatively or additionally comprises a second conduit in fluid communication with the second bath vessel and first bath vessel, whereby gravity causes transfer of a molten metal bath residing in said upper second bath vessel to said first bath vessel. The second conduit preferably comprises an inlet disposed in the lower half of the second bath vessel and an outlet disposed in the upper half of the first bath vessel. The second conduit can include a second valve (e.g., a ball valve) to control molten metal transfer. Where both first and second conduits are present, bidirectional flow between the bath vessels can be achieved.

The reactor system is preferably equipped with appropriate inlets and outlets. For example, each bath vessel can be characterized by at least one gas exhaust port, at least one steam inlet port, at least one feedstock inlet port, at least one gas steam inlet port and/or a slag removal port. The inlet ports can be located above, or preferably below, the surface of the molten metal in each bath vessel and can include tuyere injection. Gas exhaust ports are generally located in the head space of the reactor. A slag removal port is generally located approximately at the surface level of the liquid bath.

The vessels can further contain baffles, plates or other means for directing the flow of the feed, gases and/or molten metals within the bath to control residence times.

Figure 4:
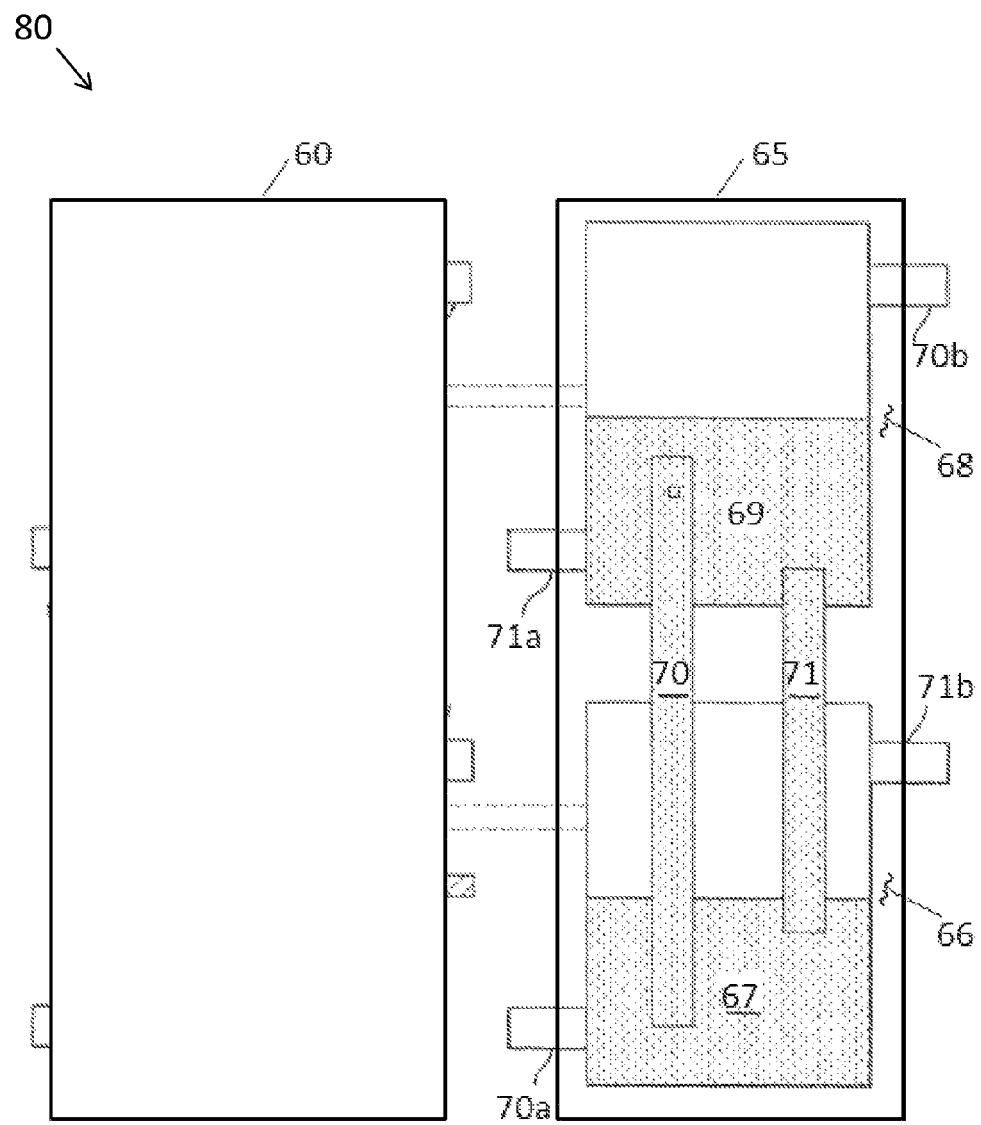
FIG. 4 is a schematic representation of four molten metal baths, wherein the first and second molten metal baths are with a first reactor housing on the left-half side of FIG. 4 and represented by a solid, rectangular block, and the third and fourth molten metal baths are on the right-half side of FIG. 4.

With reference to FIG. 4, the reactor system 80 can comprise a plurality of the reactors discussed above. In this embodiment, the reactor system 80 may have a first reactor housing 60 and a second reactor housing 65, the reactor system 80 can further comprise, for example:

a. a third bath vessel 66 capable of containing a molten metal bath 67 having a bath temperature, T3, and a bath pressure, P3;

b. a fourth bath vessel 68 capable of containing a molten metal bath 69 having a bath temperature, T4, and a bath vessel pressure, P4, disposed above said third bath vessel;

c. a second reactor housing 65 characterized by a housing temperature, T11, wherein the third bath vessel 66 is contained within the second reactor housing 65 and having a gas zone having a gas zone pressure, P11, disposed therebetween and wherein P11 approximately the same as P3 and T11 is less than T3;

d. a third conduit 70 in fluid communication with the third bath vessel 66 and fourth bath vessel 68, whereby the pressure difference between P3 and P4 causes transfer of a molten metal residing in said third bath vessel 66 to said upper fourth bath vessel 68 and wherein the third conduit 70 comprises an inlet 70a disposed in the lower half of the third bath vessel 66 and an outlet 70b disposed in the upper half of the fourth bath vessel 68;

e. a fourth conduit 71 in fluid communication with the third bath vessel 66 and fourth bath vessel 68, whereby gravity causes transfer of a molten metal residing in said fourth bath vessel 68 to said third bath vessel 66; wherein the fourth conduit 71 comprises an inlet 71a disposed in the lower half of the fourth bath vessel 68 and an outlet 71b disposed in the upper half of the third bath vessel 66.

The multiple reactor housing can be separate and distinct or conjoined, e.g. as a quad configured reactor with four bath vessels. Other arrangements can be envisioned as well.

Figure 2:
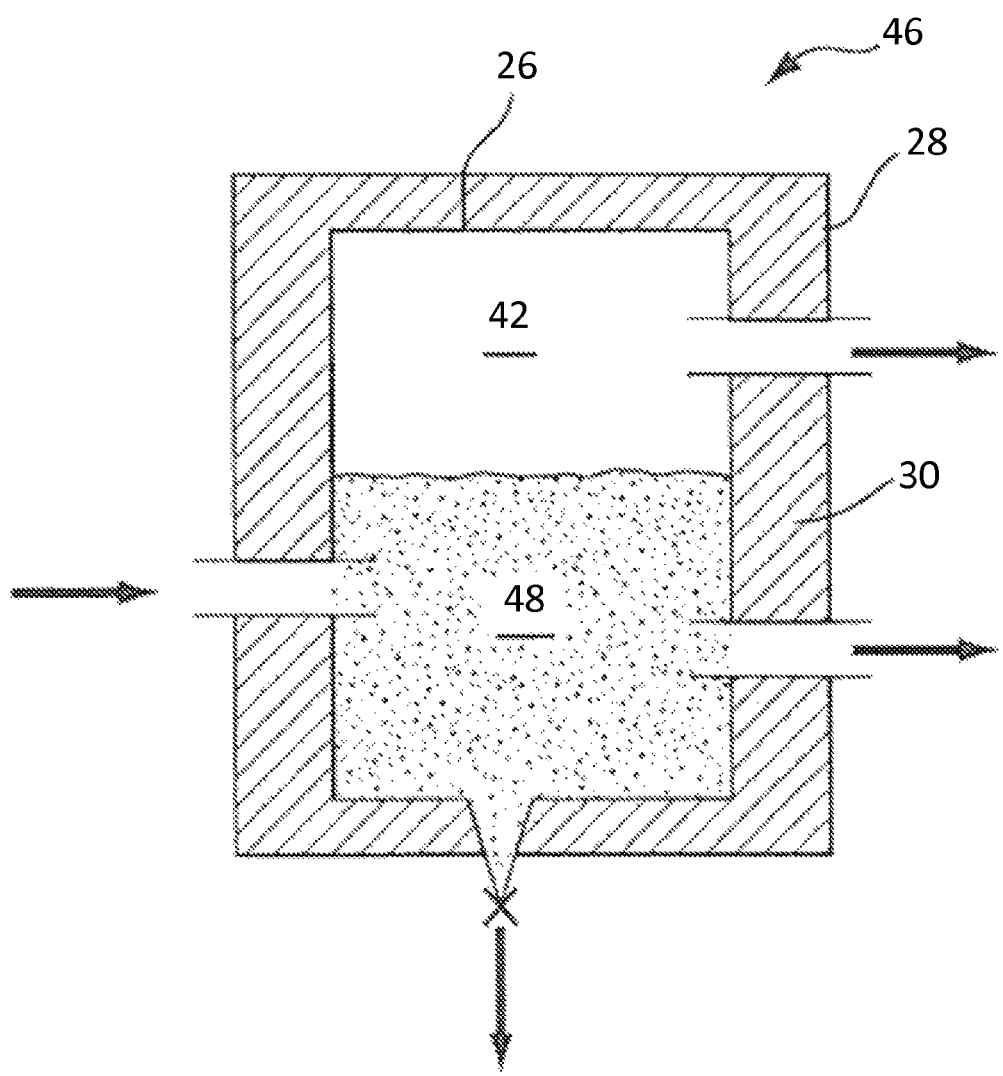
FIG. 2 is a conceptual view of another example of a novel molten metal containment vessel.

Referring to FIGS. 1 and 2, FIG. 1 is a conceptual view of an example of a liquid metal, or molten metal bath system generally denoted by the numeral 40. In the example of FIG. 1 system 40 includes a first chamber 42 and a second chamber 44 disposed within a reactor housing 46. System 40 may include one, two or more chambers. Additionally, multiple chambers of system 40 may be incorporated into one or more separate vessels generally referred to herein as reactors.

For purposes of description, system 40 is utilized to process solid, liquid and gaseous elements from a feedstock. The feedstock is injected into a high temperature liquid metal bath 48 where the elements are disassociated into their atomic constituents. Multiple liquid metal baths operating at high pressure allow for further partitioning of elements and compounds for significant advantages. Therefore, a system that facilitates the transfer of the liquid metal from one chamber or bath to another facilitates advantages.

For purposes of explanation, first chamber 42 is provided herein as the primary or initial reactor bath. The feedstock is injected into molten metal 48 contained within first chamber or bath 42. Molten metal 48 is transferred to second chamber or bath 44 for further processing via molten metal transfer system generally denoted by the numeral 50. Molten metal 48 may be further transferred to additional chambers or back to primary chamber 42.

Various means and mechanisms for transfer of molten metal 48 may be utilized. One example of transfer system 20 is described herein and is adapted to transfer molten metal 48 horizontally or vertically. In the illustrated example, transfer system 20 utilizes pressure differential. For example, molten metal 18a is positioned in chamber 42 and molten metal 18b is positioned in chamber 44 which in this example is elevationally, or in terms of pressure head, above chamber 42. Liquid metal transfer system 20 includes piping 22 and control unit 24. Piping 22 provides one or more fluid paths between chambers 42 and 44. In this example, conduit 22a provides a path from chamber 42 to chamber 44 and conduit 22b provides a path from chamber 44 to chamber 42. Control unit 24 is functionally and operationally connected to one or more discharge ports 26a, 26b and chambers 42 and 44. Utilizing pressure differentials, and regulation of feed and discharge from chambers 42 and 44, controller 24 can provide the desired movement of metal 48 through the various chambers.

Another aspect of the present system is the provision of a novel thermal barrier vessel design. Refer now to FIG. 2, wherein a conceptual view of a single chamber reactor 46 is illustrated. Reactor 46 includes an inner vessel 26 and an outer vessel 28. Positioned between inner vessel 26 and outer vessel 28 is a fluid thermal barrier material 30. In the present examples, thermal barrier material 30 is either a liquid or gas. One example of a thermal barrier material 30 is argon.

The inner vessel 26 may be at a pressure such as 160 bar. Thermal fluid barrier 30, such as argon, may be contained between vessel 26 and 28 at a pressure proximate to or higher than the pressure inside of the inner vessel. Thermal barrier 30 facilitates shielding outer vessel 28 from the internal temperatures and provides a pressure containment means.

The reactor system can advantageously be used in multi stage reactions. For example, each bath vessel can be characterized by a head space and the head space of the first bath vessel is in fluid communication with the molten metal bath of another bath vessel, e.g., the third bath vessel; the head space of the fourth bath vessel is in fluid communication with another bath vessel, e.g., the second bath vessel. Additional vessels can be incorporated within the housing, above, below, between or next to the first and/or second bath vessel. For example, a heat exchanger can be incorporated to assist in optimizing the dispersion of heat generated in a bath. Various combinations can be easily envisioned.

The reactor systems can be used to manufacture high purity, high pressure gas streams, and other products.

Another aspect of the invention includes processes of manufacturing high purity, high pressure gas streams, which preferably (but is not necessarily limited to) using the reactors described herein. In one embodiment of the invention a process for making a high purity methane gas comprises the steps of:

a. Adding a carbon-containing feed stream into a first bath vessel containing a first molten metal bath wherein the first bath vessel is maintained at a pressure, P1, of at least 1 bar, preferably at least 100 bar, and producing a first vessel gas stream comprising carbon monoxide and hydrogen sulfide;

b. Removing the first vessel gas stream from the first bath vessel and introducing the gas stream into a third bath vessel containing a third molten metal bath wherein the third bath vessel is maintained at a third pressure, P3, of at least 1 bar, preferably at least 100 bar, optionally adding an oxygen source, such as steam or an oxygen containing feed, and producing a third vessel gas stream comprising hydrogen, $SO_3$ and carbon dioxide;

c. Removing the third vessel gas stream from the third vessel, and optionally condensing the $SO_3$ therefrom and/or removing the carbon dioxide; thereby obtaining a purified high pressure hydrogen gas;

d. Adding steam to a fourth bath vessel containing a fourth molten metal bath characterized by a low carbon content, wherein the fourth bath vessel is maintained at a fourth pressure, P4, of at least 1 bar, preferably at least 100 bar, thereby producing purified hydrogen;

e. Adding the gas streams produced by step (c) and/or (d) to second upper bath vessel containing a second molten metal bath maintained at a second pressure, P2, of at least 1 bar, preferably at least 100 bar, and a temperature of less than about 1000 F, preferably about 800 F characterized by a high carbon content, thereby producing purified methane.

In another aspect, a process for making a high purity syngas comprises the steps of:

a. Adding a carbon-containing feed stream into a first bath vessel containing a first molten metal bath wherein the first bath vessel is maintained at a pressure, P1, of at least 1 bar, preferably at least 100 bar, and producing a first vessel gas stream comprising carbon monoxide and hydrogen sulfide;

b. Removing the first vessel gas stream from the first bath vessel and introducing the gas stream into a third bath vessel containing a third molten metal bath wherein the third bath vessel is maintained at a third pressure, P3, of at least 1 bar, preferably at least 100 bar, optionally adding an oxygen source to maintain a metal oxide rich bath environment, such as steam or an oxygen containing feed, and producing a third vessel gas stream comprising hydrogen, $SO_3$ and carbon dioxide;

c. Removing the third vessel gas stream from the third vessel, and optionally condensing the $SO_3$ therefrom and/or removing the carbon dioxide; thereby obtaining a purified hydrogen gas;

d. Adding steam to a fourth bath vessel containing a fourth molten metal bath characterized by a low carbon content, wherein the fourth bath vessel is maintained at a fourth pressure, P4, of at least 1 bar, preferably at least 100 bar, thereby producing purified hydrogen;

e. Adding oxygen gas to a second bath vessel containing a second molten metal bath maintained at a second pressure, P2, of at least 1 bar, preferably at least 100 bar, and a temperature of less than about 1000 F, characterized by a high carbon content, thereby producing purified carbon monoxide.

In yet another embodiment, a process for making a high purity hydrogen gas comprises the steps of:

a. Adding a carbon-containing feed stream into a first bath vessel containing a first molten metal bath wherein the first bath vessel is maintained at a pressure, P1, of at least 1 bar, preferably at least 100 bar, and producing a carbon rich molten metal bath;

b. Transferring the carbon rich molten metal bath to a second upper bath vessel; maintained at a second pressure, P2, of at least 1 bar, preferably at least 100 bar, and a temperature of less than about 1000 F;

c. Adding steam to the carbon rich molten metal bath thereby producing a high purity hydrogen gas.

These processes can use one or more reactors as described above, such as a dual conjoined reactor or a pair of dual conjoined reactors.

The processes contemplate employing molten metal baths. The molten metal baths can comprise a number of metal species and can include reactive or non reactive species. The reactive species are preferably those that undergo oxidation/reduction reactions. Nickel and iron can be selected with iron being preferred. Of course, the reactive species need not be molten itself. In one embodiment, the reactive species can be added and maintained as a solid, for example, in the form of iron filings. The molten metal bath can be selected to have substantially the same density of the solid reactive species to facilitate suspension and avoid layering in the bath. In one embodiment, the molten metal baths can be selected to facilitate purified carbon transport between vessels (e.g., between the first and second vessel of the methane or syngas production system). One preferred bath for the first and second vessels can be a Sn/Pb alloy having iron filings suspended therein.

The metal baths can also include antimony (Sb), Cobalt (Co) germanium (Ge), indium (In), molybdenum (Mo), lead (Pb) tungsten (W), bismuth (Bi), cadmium (Cd), copper (Cu), gold (Au), iridium (Ir), mercury (Hg), nickel (Ni), osmium (Os), platinum (Pt), rhenium (Re), rhodium (Rh), ruthenium (Ru), selenium (Se) and/or tellurium (Te).

The feedstock used in the processes are generally carbon containing and are preferably hydrocarbon-containing feedstocks. Suitable feedstocks include comprises a coal, petroleum coke, coal, lignite coal, oil shale, natural gas or biomass, liquid or gaseous hydrocarbons (e.g., methane, ethane and the like). Waste materials, such as wastes having a thermal content of at least about 4,000 BTU per pound can also be used. Combinations of feedstocks can be selected to provide an improved or optimal carbon, oxygen, water balance.

The feedstock can be added by several means, including but not limited to auger extrusion, bottom or side injection or by steam-cooled top lance injection.

As discussed above with respect to the reactors, the pressures in at least one, two, three, four or all bath vessels can be maintained at pressures of at least about 1 bar, such as at least about 10 bar or more, e.g., between 1 (or 10) and about 600 bar. Preferably the pressure is maintained in the range between about 150-200 bar. The reactor, or vessel(s), pressures can be controlled or maintained by the hydrocarbon feedstock addition rate(s).

The inventions relate to the discovery that that molten metal baths can be transported easily between bath vessels (such as vertically aligned bath vessels) by maintaining a pressure differential greater than the pressure required to lift the metal and overcome resistance in metal transfer piping in a vertical and/or a diagonal direction. This feature is discussed in more detail with respect to the reactors.

In the conversion of a hydrogen disulfide, carbon monoxide and/or water, (as illustrated herein in the third and fourth bath vessels) the baths are preferably maintained at a temperature at least greater than the melting point of the metal or alloy (e.g., 1000° F.) and generally not greater than about 3000° F. (e.g., between about 2000° F. and 3000° F.). In general, the bath used in the conversion of carbon to methane is not greater than 800-1000° F. As such, the conversion of the feedstock to carbon monoxide and carbon in the first bath vessel is also generally not greater than 1000 F.

The processes described herein often employ feedstocks that contain certain amounts of impurities, such as heavy metals and mercury. Many of the heavy metals are removed from the process in the slag layer in the first vessel. Mercury, however, is often removed in the gas stream removed from the first vessel. In one embodiment, the invention further comprises a step of extracting Hg before it enters the third bath vessel or even after it exits the third bath vessel in the bath vessel gas stream.

Likewise, hydrocarbon feedstocks generally contain sulfur. Adding the hydrocarbon feedstock to a molten metal bath generally converts sulfur to hydrogen sulfide (e.g., in the first bath vessel). Adding oxygen to a molten metal bath (e.g., in the third bath vessel) to maintain a metal oxide rich bath can result in the conversion of the hydrogen sulfide to $SO_3$, which is then removed in the off gas stream exiting the third bath vessel. The invention contemplates the additional step of extracting the SO₃ from this off gas stream by quenching with water to produce $H_2SO_4$, a very useful saleable product.

High pressure carbon dioxide is also produced in the third bath vessel. The method contemplates the optional step of the separating $CO_2$ in the off gas stream of the lower bath of the second set of vertical baths. The carbon dioxide and can be used in further applications and can be obtained as a supercritical fluid. A supercritical, or other high pressure, $CO_2$ gas stream can be used for direct $CO_2$ pipeline injection for enhanced oil recovery. Can be sequestered into a saline aquifer.

A method of claim 1 comprising the step of oxidizing dissolved carbon in the first upper molten metal bath with water to produce $CO+H_2$.

The processes described herein employ several chemistries. For example, the process contemplates recycling recovered $H_2$ from the off gas stream of the upper bath of the second set of vertical baths back to the upper first bath as a reducing gas for the production of methane and homologous hydrocarbons by oxidizing the reactive bath metal (e.g. Fe) with steam to produce metal oxide and hydrogen gas.

As described above, the process contemplates producing a slag layer. The slag layer assists in removing impurities and controlling dust and ash. The processes of the invention can therefore comprise the step of forming a slag layer by addition of a flux consisting of typical oxides of Ca, Fe, K, Mg, Na, Si, Sn, Ti and the like.

Maintaining a pressure balance between the two, three, four or more bath vessels can optimize the efficiency of the system and the processes described herein, For example, in the four vessel system described herein, maintaining the relative pressures such that the pressure in first bath vessel such that it is usually or always greater than that in the third bath vessel, which in turn is generally maintained at a higher pressure than the fourth bath vessel, which, in turn, is generally maintained at a higher pressure than the second bath vessel. This configuration allows optimal transfer of gaseous materials between all baths without the need for gas compression. Where the vessels are also maintained as a pair of vertically disposed vessels, the arrangement permits good molten metal transfer between the pairs of vessels as well.

In one embodiment, $H_2$ reduction of atomic carbon to hydrocarbons using a molten metal catalyst, instead of a solid support catalyst, increases the overall catalyst surface area while reducing the structural requirements for providing a comparable solid catalyst surface area and reducing the potential for solid catalyst meltdown from the excessive temperatures that are required to get comparable yields of hydrocarbon.

It is understood that, with respect to the above processes, that not all steps are required in all applications and/or that one step can be replaced by an equivalent process step. Thus, the inventions include processed that are characterized by one, two, three, four, all of the delineated steps set forth above. In some embodiments, the bath vessel in which the hydrocarbon feedstock(s) are introduced can also be modified. Thus, while the specifically described processes generally refer to the addition of the feedstock into the first bath vessel, it is possible that feedstock can be added to any other bath vessel.

One may use two dual bath reactors or a quad configuration for the direct production of synthetic natural gas (SNG) or pure methane. In one version of the invention, a high concentration of carbon containing fragments (e.g., a feedstock having, for example, at least 15% by weight of carbon), is transferred to an adjoined molten reactor. The steps of such a process may comprise (a) introducing a hydrocarbon feed into a first molten metal bath (such as, a "primary Sn bath") by, for example, bottom injection at an operating pressure of 150-200 bar causing decomposition of the hydrocarbon feed into hydrogen and carbon containing fragments that dissolve or suspend in the molten metal bath thereby increasing the overall net carbon concentration. Alternatively or additionally, the bath metal may include metals, or alloys of metals, such as Fe, Ni or related "active" bath metals.

In the preferred mode of operation, the carbon concentration in the molten metal is controlled so that it does not exceed its solubility limit. The resulting hydrogen-rich gas ($H_2$) stream, may also contain CO. The production of CO is generally proportional to the molar amount of oxygen contained in the hydrocarbon feed. This gas stream and byproducts of N, S, Hg and other gaseous contaminants and entrained dust (if any) are then transferred to a second reactor (e.g., the "primary Fe bath").

This latter bath, preferably has a highly oxidized metal (e.g., FeO) that can serve as the oxygen source to convert the gas stream originating from the first bath (e.g., the "primary Sn bath") to primarily $CO_2$, $SO_3$, $N_2$ and $H_2$ while providing an upper "secondary Fe bath" with partially oxidized metal substantially free of carbon and other impurities. Separation of the off gasses from the first molten metal zone (e.g., primary Sn bath) is achieved by removing the Hg and $SO_3$ in successive condensers and the $H_2$ from the $CO_2$ by pressure swing absorption (PSA).

$$S+3FeO = SO_3+3Fe$$

A portion of the first molten metal bath, or primary Sn bath, can be reversibly transferred to an adjoined upper metal containing bath (the "secondary Sn bath") by operating on the basis of differential pressure between reactor baths in vertical alignment. The pressure differential required for transfer is a function of the specific gravity of the bath metal and the relationship to the lift height (inches of column). Varying the pressure differential between the lower and upper metal bath can control rate of transfer. Metal transfer can also be controlled by releasing or building pressure using, for example, the exit gas control valves and feedstock injection rates. The upper, or "secondary Sn bath," is injected with steam to react with dissolved carbon producing $CO+H_2$ in a 1:1 molar ratio (syngas), or with hydrogen gas to form methane, as described in more detail below.

$$C+H_2O = CO+H_2$$

In one embodiment, metal may be transferred from the upper bath to the lower bath, an operation that requires an alternating pressure differential. Regulating bath pressures between the reactors can also facilitate the transfer of gases from one reactor to another, e.g., by selecting a pressure drop. It is particularly useful to maintain the relative pressure in the first bath vessel (P1) greater than that in the lower or third bath vessel (P3) which is greater than that in upper or second bath vessel (P2). If the upper or second bath is always maintained at a lower pressure than the other three baths, then gaseous materials may always be transferred to upper bath one, in the order of decreasing bath pressure, without the need for intermittent gas compression.

It is particularly advantageous to produce a high purity, high pressure (supercritical) $CO_2$ gas stream. The primary costs associated with the capital costs and the energy costs for gas compression can add up to twenty percent of the overall process expenditure. The fact that the $CO_2$ gas stream exits the reactor under supercritical conditions can used to great advantage for direct $CO_2$ pipeline injection for enhanced oil recovery or to be sequestered into a saline aquifer because this would obviate the compression costs.

Another preferred operating mode of this process produces a pure methane ($CH_4$) stream by moving the highly oxidized liquid metal (Fe/FeO) in "primary lower Fe bath", free from impurities, to an upper "secondary Fe bath" maintaining the pressure at about 200 bar by utilizing a pressure differential. Alternatively, the metal bath may comprise Pb, Sn or other metals and alloys. The highly oxidized state of the lower "primary Fe bath" metal bath can be maintained by transferring the molten metal containing dissolved FeO gravimetrically from the adjoined upper bath in a continuous manner. Since the upper "secondary Fe bath" is basically free from all carbon and other deleterious impurities (e.g. N, S, Hg) when it is injected with steam to further oxidize the metal, a pure $H_2$ stream is produced. This pure $H_2$ stream can continuously be removed or in this $$Fe + H_2O = FeO + H_2$$

application it can be injected into the carbon saturated upper liquid metal bath ("secondary Sn bath"), that is maintained at a temperature below about 800° F., to optimize production of pure $CH_4$.

$$C + 2H_2 = CH_4$$

It is also worthy of note that the stoichiometry of the direct reduction of atomic carbon for the production of methane requires $2H_2$. This is a distinct advantage over conventional methods utilizing syngas ($CO:H_2$) over a Ni catalyst because this process must be operated in tandem with a water shift reaction ($CO + H_2O = H_2 + CO_2$) and the methanation step requires the net consumption of $3H_2$ with the formation of a water molecule.

There are other advantages to using a molten metal catalyst for the production of methane and related hydrocarbons. As is known in the art, most processes that can accomplish this type of atomic carbon reduction utilize of a metal catalyst adsorbed on a solid catalyst support. Such methods suffer the disadvantages of a greatly reduced surface area relative to a molten metal catalyst. These types of catalytic surfaces often require relatively high temperatures to affect the desired yield of reduction and as a consequence of accompanying high exothermicity may suffer "hot spots" with catalyst meltdown.

The method of the present invention is aimed at the relatively low cost production of large quantities of high quality, high pressure gas streams of methane, syngas and hydrogen. The high cost associated with available production methods for such high value gas streams demonstrates the need for more economical and environmentally friendly methodologies. According to the present invention, high volumes of high purity, high pressure gas streams can be economically generated.

The present invention generally relates to a method for producing and recovering gaseous products for further transfer and remediation in a series of conjoined metal baths, by chemically oxidizing or reducing the carbonaceous component of the hydrocarbon feedstock in a molten metal bath. The composition of the hydrocarbon may derive from coal sources such as Illinois No. 6 coal, petroleum coke, oils such as No. 6 fuel oil, biomass and biomass blends or waste hydrocarbon sources with a sufficient BTU value to be economical.

The molten metal bath may preferably be comprised of iron (Fe) or tin (Sn) or an alloy of these two metals. A particular metal alloy may derive from admixture of two or more metals or by the introduction of an oxide of one or more such metals (e.g. $Fe_2O_3$ or $SnO_2$) to the molten metal bath for in situ reduction of the metal oxide to its respective metal within the bath by the action of dissolved carbon or CO or the like. The liquid metal bath may also contain one or more metals derived from the list of reactive metals that may include antimony (Sb), Cobalt (Co) germanium (Ge), indium(In), molybdenum (Mo), tungsten (W), lead (Pb) and zinc (Zn). As is well known in the art, these so-called "reactive metals" and their respective metal oxides have free energies of oxidation, at the temperature and partial pressure of oxygen of the bath, that is greater than that for the conversion of carbon to carbon monoxide. Contrariwise, the metal bath may also include at least one of the metals taken from the list of relatively "unreactive metals" that may include bismuth (Bi), cadmium (Cd), copper (Cu), gold (Au), iridium (Ir), mercury (Hg), nickel (Ni), osmium (Os), platinum (Pt), rhenium (Re), rhodium (Rh), ruthenium (Ru), selenium (Se) and tellurium (Te). The latter list of potential bath metals lie above the "CO line" ($2C + O_2 = 2CO$) represented by a plot of the bath temperature versus the free energy of the partial pressure of oxygen ($p_{O2}$) for this series of metals. Such relatively "unreactive metals" under the conditions of our method should have an oxygen partial pressure ($p_{O2}$) in equilibrium with the metals and metal oxides that is relatively high. Such metals can serve to restrict the effective concentration of the active metal within the metal bath that is actually involved in the metal oxidation step.

Figure 3:
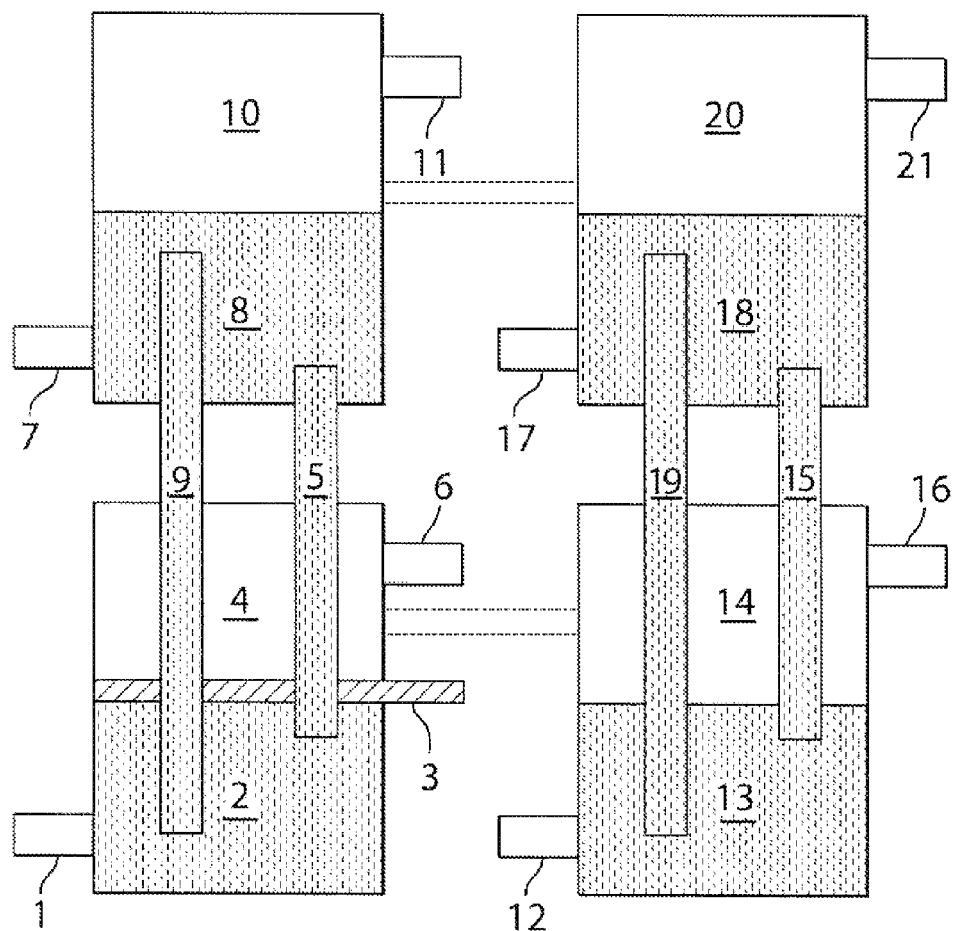
FIG. 3 is a schematic representation of a series of molten metal baths and optional head space fluid communication means that can be juxtaposed in both horizontal and vertical positions that constitute an overall reactor for conducting the method of the invention.

The series of metal baths illustrated in the FIG. 3, is one embodiment of an overall reactor suitable for practicing the method of the invention. While we do not wish to be restricted to any one design for a molten metal bath reactor, there are several design elements unique to the multiple liquid metal bath reactor described in the FIG. 3. The high temperature liquid metal bath containment vessel is designed to operate at high pressures in excess of 200 bar. A Provisional Patent Application No. 61/025,684 has been filed that more specifically describes this reactor. The molten metal bath itself is surrounded by a high pressure containment vessel that is maintained at a pressure above that of the metal bath. This system is novel to the existing art for such gasification systems because the structural integrity of the containment vessel for the metal bath, while being exposed to the high operating temperatures of the metal within the bath, is not directly exposed to the high operating temperatures at 200 bar pressure and this is an advantage. The outer gas zone also suffices as a temperature moderator because the outer steel pressure vessel is not subject to the high temperatures within the liquid metal bath. This is a distinct advantage of this invention in design and safety of operation because as elaborated in the teachings of Kindig et. al. (U.S. Publication No. 20020124466) coal gasification is preferably operated at ambient or near ambient pressures, not to exceed 5 psi. When the unit is operated at an elevated pressure, substantial quantities of methane-containing products are formed that can contaminant the hydrogen gas stream. The high pressures also offer advantages in residence time within the reactor itself to insure adequate steam residence time within the reactor. But more importantly, the off gas product streams exit the reactor at pressures only slightly reduced from the metal bath operating pressures often approaching 200 bar. This offers distinct economic advantages in capital costs associated with compressing the off gases in applications where gaseous products such as syngas are required to be at high pressure.

Another novel aspect of this invention is the liquid metal transfer system. While conventional wisdom dictates that the movement of metal within a liquid metal bath detracts from the cost effectiveness of a process, our invention operates on the basis of differential pressure between reactor baths in a vertical alignment. Since we are already at a high pressure within the reactor, the cost of pumping carbon saturated metal from a lower to a higher position does not add directly to the cost of the operation. Thus, accurate control of the metal transfer rates at high pressure is a key advantage over prior art. Metal transfer rates can be controlled by releasing or building pressure using the exit gas control valves and feedstock injection rates. Moving metal from a lower bath to an upper bath requires a pressure difference greater than the pressure required to lift the metal and overcome resistance in metal transfer piping. Mainly, the force of gravity overcoming metal transfer piping resistance accomplishes the return of molten metal, that is largely depleted of carbon, from the upper bath to the lower bath. Metal transfer systems can be used with or without transfer piping control valves depending on the feedstock and the metal catalyst used.

Adequate control of the rate of liquid metal flow, as well as, the gas flow during operation is another unique feature of this multiple bath reactor design. Thus, the flow of hot metal and gases within the reactor itself is inhibited by design by immersed bath static strippers. The use of such an intermediate interruption in flow is unique in that the liquid metal is diverted by the stripper affecting increased residence time in the bath, while gas flow through the strippers provides reduced gas bubble size. The bath operating at high pressure in combination with the reduced gas bubble size provides for a coalescent liquid metal bath surface verses the prior art having a turbulent surface with splashing caused by large gas bubbles breaking the surface. The quiescent surface also minimizes contamination of the product gas and splashing of metal and slag on the walls of the vessel.

The method of introduction of the feedstock into the reactor is also of fundamental importance. Although we do not wish to be restricted to any one type of feed system, in the preferred mode of this invention the material should be feed directly into the molten metal bath. This insures that the rate of decomposition and hence the rise in pressure is controlled in a measurable manner. The preferred manner of feed introduction of solids, rendered in a particulate manner of fairly uniform size, may be introduced by auger extrusion either as a solid or in slurry form. Gases and liquids may be introduced in a well established fashion as is known in the art.

This multiple liquid metal bath reactor system can be used effectively in a mode using two or more multiple bath reactors. A preferred embodiment is the use of two dual bath reactors or a quad configuration for direct production of synthetic natural gas (SNG) or pure methane. Referring to the FIG. 3, solid hydrocarbon feedstocks (including but not limited to coal or petroleum coke) are fed into the lower Sn bath 2 of the reactor at a rate that generates a controlled pressure of 150-200 bar via inlet port 1. Upon thermal dissociation of the hydrocarbon feedstock, moisture present in the feedstock oxidizes dissolved carbon to CO gas and $H_2$. Over-oxidation of the carbon results in the formation of $CO_2$. Bath conditions can be selected such that the bath, saturated in dissolved carbon, will result in the endothermic reduction back to CO.

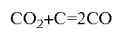

The CO and additional offgases from lower bath 2 will generally contain contaminants, including $H_2S$, $N_2$ and Hg. This gas stream is fed into the lower iron (Fe/FeO) bath 13. via gas transfer stream 6 and inlet port 12. The lower iron bath 13 is rich in FeO and converts the combined gas stream from 2 to primarily $CO_2$, $SO_3$, and $H_2$ after condensing out the mercury while providing partially oxidized iron metal free of carbon, which can then be transferred to the upper iron bath 18 via transfer line 15.

Water derived from the feedstock in its conversion to CO is oxidized exothermically to $CO_2$ providing thermal energy to the lower Fe bath. Thus, water present in the feedstock is not necessarily a deleterious problem, as compared to prior art processes. Thus, in one embodiment, the feedstock may optionally contain water, e.g., in amounts up to about 70% by weight, preferably up to 50% by weight, more preferably up to about 20% by weight. In some embodiments, water or steam can be injected with the feedstock or separately into the bath 2 exactly for this purpose. For example, steam can be added in an amount of at least 60% by weight of carbon in the feedstock, preferably between about 10 and 40% by weight. The amount of water added is related to the amount of water initially present in the feedstock to arrive at a total water content of up to about 70% by weight of carbon in the feedstock. In other embodiments, water can be injected into the bath for steam to be generated in situ.

Lower bath 2 can optionally act as a scrubber for the hydrocarbon feedstock, thereby providing carbon-saturated Sn metal or a Sn metal composition which contains significant amounts of carbon. Preferably, the Sn metal composition is substantially free of impurities. The Sn metal composition can be transferred by differential pressure or mechanically to upper Sn bath 8 via transfer line 5. The upper iron bath 18 is preferably substantially free of dissolved carbon. Steam is injected into the bath 18 via inlet 17 to further oxidize the Fe metal and produce FeO and pure $H_2$.

This highly purified, high-pressure $H_2$ gas stream exits from point 21 and can be recovered in whole or in part and/or injected through valve 11 into the carbon saturated upper liquid Sn metal bath 8. Highly-purified, high-pressure $CH_4$ can be produced by the reduction of dissolved carbon in the upper liquid Sn metal bath 8. The Fe/FeO metal stream in upper Fe bath 18 can be transferred to lower Fe bath 13 via transfer line 19 for reduction by the off gas stream from lower Sn bath 2. A high pressure (e.g., between about 150-200 bar) is maintained throughout the system (e.g., head spaces 4, 10, 14 and 20) to optimize purity and pressure of the product gas streams. The use of such a series of conjoined metal baths represents a distinct departure from known methods and not only provides a system that does not require conventional gas scrubbing and disposal of solid wastes, but additionally, allows the conversion of these entrained impurities to saleable high pressure off gas streams ($CO_2$, $SO_3$ and $H_2$).

Slag, as needed, is removed from lower Sn bath 2 through slag exit point 3. Hydrocarbon feed, e.g. a feed with a high ash content, may be passed through the lower primary molten metal bath 2 to preferentially separate out a portion of the dust from the hydrocarbon feed in the slag layer. As a portion of the dust is entrained in the slag layer, the concentration of dust in the head space 4 and thereby removed in the gas stream via exhaust port 6 can be reduced. The slag preferably removes at least a portion of the dust generated from the hydrocarbon feedstock, this is particularly true where the hydrocarbon feedstock possesses a high ash content.

In a preferred embodiment of the process of the invention, sulfur from the hydrocarbon feed can also be removed and/or recovered from the process. The $SO_3$ produced can be removed from gas stream 16 by condensation. Quenching with water produces sulfuric acid ($H_2SO_4$) having purities up to and above 90%; a byproduct of considerable economic value.

The molten metal reactor can include both sets of conjoined reactors, as shown in the FIG. 3 or can include one conjoined reactor, such as the two such molten metal baths aligned vertically as shown in the FIG. 3 (baths 2 and 8). In this embodiment the off gases from the lower metal bath can be scrubbed in a conventional manner to remove impurities from the syngas produced therein. This embodiment preserves the distinct advantages of maintaining high pressure and reversible metal circulation, thereby insuring an upper bath substantially free from feedstock impurities (e.g. S and Hg) that exit the lower bath as off gases and dust that exits with the slag. For example, operation in this mode offers distinct advantages in the production of high purity, high pressure hydrogen gas streams from the moisture induced oxidation of Fe, Sn or comparable metal alloys. In this embodiment of the invention where only two metal baths, vertically juxtaposed are involved, sulfur from the hydrocarbon feed can also be allowed to build up to in the lower molten metal bath, react to form hydrogen sulfide and be removed from the off gases at high pressure by conventional means such as caustic scrubbing, etc.

The initial liquid state of the metal bath can achieved by plasma torch, electric arc or most preferably by induction coil heating. The desired temperature of the iron bath (up to 3000° F.) can be maintained by induction currents flowing through coils or loops or by the exothermic oxidation of Fe by injected oxygen. The temperature of lower Fe bath 13 can be increased by the oxidation of CO to $CO_2$.

Suitable means to inject a predetermined amount of steam into bath 18 through injection point 21 includes simple steam lances. Steam infection is one means that can be used to effectively control the temperature of the process due to the reaction of water with iron. Since the iron and tin baths must be operated at substantially different temperatures, it is necessary to pass the $H_2$ gas stream exiting gas valve 21 at temperatures approaching 2000° F. through a heat exchanger prior to introducing this $H_2$ reductant stream into upper Sn bath 8 though entrance valve 11 where temperatures should not exceed 900° F. However, the latent heat from this temperature reduction can advantageously be used for the production of steam used in the accompanying water reduction step. Additionally, the transfer of thermal energy from the Fe bath, which basically operates under exothermic conditions, can ameliorate the heat balance in the Sn baths where the endothermic oxidation of carbon by water tends to deplete the bath temperature, Illustrations Illustration I High purity, high pressure methane, ($CH_4$) was produced from petroleum coke feedstock containing 79.0% carbon, 3.6% hydrogen, 6.7% sulfur and 9.0% water. The finely ground petroleum coke is bottom injected through injection point 1 into a 950° F. molten Sn bath 2 at a rate of 1 lb/sec. Thermal decomposition of the hydrocarbon feedstock results in a constant pressure of 150 bar in lower bath gas zone 4. Molten Sn/C is transferred from lower Sn bath 2 to upper Sn bath 8 via transfer line 9 by maintaining a reduced pressure of 135 bar in upper gas space 10. Slag removal as necessary is maintained through slag removal system 3. An additional 0.39 lb/sec of water is injected through injection point 1 into bath 2 for the oxidation of C to CO in lower Sn bath 2.

The combined off gases (CO, $H_2$, $H_2S$, Hg and $N_2$) transfer continuously through gas transfer control valve 6 through injection point 12 into a 2850° F. molten Fe/FeO bottom bath 13. The CO is oxidized, in whole or in part, to $CO_2$ by the action of iron oxides (FeO, $Fe_2O_3$ etc.) in lower bath 13 and, thereby, provides thermal energy to, in whole or in part, maintain the bath temperature. The off gases from lower Fe/FeO bath 13 at 149 bar exit through gas valve 16 for further processing.

Molten Fe/FeO is transferred by differential pressure from lower Fe/FeO bath 13 to upper Fe/FeO bath 18. The upper gas space 20 is maintained at 141 bar. Steam (0.60 lb/sec) is injected into the upper Fe/FeO bath 18, which is maintained at 2850° F. A high pressure (141 bar) stream of pure $H_2$ is produced and exits through gas valve 21 (0.07 lb/sec). The $H_2$ gas enters a heat exchanger at an inlet temperature of 1900° F. with the $H_2$ gas at a rate of (0.09 lb/sec) separated from the processed gas stream exiting through gas valve 16. After heat reduction to 750° F., the $H_2$ is transferred through injection point 7 at a rate of 0.09 lb/sec into a carbon saturated molten Sn bath 8. The dissolved C is reduced by the $H_2$ gas, producing $CH_4$ gas into gas zone 10. The gas in zone 10 has a temperature of 750° F. and exits the reactor through gas valve 11.

The high purity high pressure $CH_4$ gas stream is produced continuously at a rate of 0.62 lb/sec. Saleable products are produced from the remaining off gases; 0.17 lb/sec of $SO_3$ and 1.18 lb/sec of $CO_2$.

The Sn in bath 8 is recycled back to Sn bath 2. Likewise, the Fe bath in bath 18 is recycled to the Fe bath 13. The method is preferably performed in a continuous fashion.

Illustration II

High purity, high pressure methane, ($CH_4$) is produced from 70% biomass/30% petcoke blended feedstock contained 55.5% carbon, 4.7% hydrogen, 2.2% sulfur, 9.7% water and 3.4% ash. The finely ground hydrocarbon feedstock is bottom injected through injection point 1 into a 950° F. molten Sn bath 2 at a rate of 13 lb/sec. The hydrocarbon feedstock is subjected to thermal decomposition. A constant pressure of 150 bar in lower bath gas zone 4 is maintained. Molten Sn/C is transferred from the lower Sn bath 2 to the upper Sn bath 8 maintaining a reduced pressure of 135 bar in the upper gas space 10. Slag removal as necessary is maintained through slag removal system 3. An additional 0.02 lb/sec of water is injected through injection point 1 into bath 2 for the oxidation of C to CO in lower Sn bath 2. The combined off gases (CO, $H_2$, $H_2S$, $N_2$) transfer continuously through gas transfer control valve 6 through injection point 12 into the 2850° F. molten Fe/FeO bottom bath 13. The CO from both sources, feedstock and additional water, are oxidized to $CO_2$ by the action of iron oxides (FeO, $Fe_2O_3$ etc.) in lower bath 13 to provide thermal energy to maintain the bath temperature. The off gases from lower Fe/FeO bath 13 at 149 bar exit through gas valve 16 for further processing. Molten Fe/FeO is transferred by differential pressure from lower Fe/FeO bath 13 to upper Fe/FeO bath 18 at 141 bar. Simultaneously, steam (5.3 lb/sec) is injected into the upper Fe/FeO bath 18 maintained at 2850° F. producing a high pressure stream of pure $H_2$ gas that exits through gas valve 21 (0.6 lb/sec) and enters a heat exchanger at a temperature of 1900° F. with the $H_2$ gas (0.8 lb/sec) separated from the processed gas stream exiting through gas valve 16. After heat reduction to 750° F., the $H_2$ is transferred through injection point 7 into carbon saturated molten Sn bath 8. The dissolved C (4.0 lbs/sec) is reduced by the $H_2$ gas producing $CH_4$ gas evolving into gas zone 10 that is maintained at a temperature of 750° F. and exits the reactor through gas valve 11.

The high purity high pressure $CH_4$ gas stream is produced continuously at a rate of 5.3 lb/sec. Saleable products are produced from the remaining off gases; 0.7 lb/sec of $SO_3$ and 11.7 lb/sec of $CO_2$.

Illustration III

High purity, high pressure methane, ($CH_4$) is produced from Illinois No. 6 coal feedstock contained 60.5% carbon, 4.1% hydrogen, 2.6% sulfur, 13.6% water and 9.9% ash. The finely ground coal is bottom injected through injection point 1 into a 950° F. molten Sn bath 2 at a rate of 14.2 lb/sec. Thermal decomposition of the hydrocarbon feedstock results in a constant pressure of 150 bar in lower bath gas zone 4. Molten Sn/C is transferred from lower Sn bath 2 to upper Sn bath 8 maintaining a reduced pressure of 135 bar in upper gas space 10. Slag removal as necessary is maintained through slag removal system 3. An additional 2.1 lb/sec of water is injected through injection point 1 into bath 2 for the oxidation of C to CO in lower Sn bath 2. The combined off gases (CO, $H_2$, $H_2S$, $N_2$) transfer continuously through gas transfer control valve 6 through injection point 12 into the 2850° F. molten Fe/FeO bottom bath 13. The CO from both sources, feedstock and additional water, are oxidized to $CO_2$ by the action of iron oxides (FeO, $Fe_2O_3$ etc.) in lower bath 13 to provide thermal energy to maintain the bath temperature. The off gases from lower Fe/FeO bath 13 at 149 bar exit through gas valve 16 for further processing. Molten Fe/FeO is transferred by differential pressure from lower Fe/FeO bath 13 to upper Fe/FeO bath 18 at 141 bar. Simultaneously, steam (5.9 lb/sec) is injected into the upper Fe/FeO bath 18 maintained at 2850° F. producing a high pressure stream of pure $H_2$ gas that exits through gas valve 21 (0.7 lb/sec) and enters a heat exchanger at a temperature of 1900° F. with the $H_2$ gas (1.0 lb/sec) separated from the processed gas stream exiting through gas valve 16. After heat reduction to 750° F., the $H_2$ is transferred through injection point 7 into carbon saturated molten Sn bath 8. The dissolved C is reduced by the $H_2$ gas producing $CH_4$ gas evolving into gas zone 10 that is maintained at a temperature of 750° F. and exits the reactor through gas valve 11.

The high purity high pressure $CH_4$ gas stream is produced continuously at a rate of 6.7 lb/sec. The saleable products produced from the remaining off gases (0.9 lb/sec of $SO_3$) are recovered as $H_2SO_4$ and 13.0 lb/sec of $CO_2$ is transferred .as a high purity, high pressure gas stream.

Illustration IV

High purity, high pressure methane, ($CH_4$) is produced from No. 6 Fuel Oil feedstock containing 85.0% carbon, 9.7% hydrogen, 2.1% sulfur and 0.7% water. The feedstock is bottom injected through injection point 1 into a 950° F. molten Sn bath 2 at a rate of 8 lb/sec. Thermal decomposition of the hydrocarbon feedstock results in a constant pressure of 150 bar in lower bath gas zone 4. Molten Sn/C is transferred from lower Sn bath 2 to upper Sn bath 8 maintaining a reduced pressure of 135 bar in upper gas space 10. Slag removal as necessary is maintained through slag removal system 3. An additional 3.2 lb/sec of water is injected through injection point 1 into bath 2 for the oxidation of C to CO in lower Sn bath 2. The combined off gases (CO, $H_2$, $H_2S$, $N_2$) transfer continuously through gas transfer control valve 6 through injection point 12 into the 2850° F. molten Fe/FeO bottom bath 13. The CO from both sources, feedstock and additional water, are oxidized to $CO_2$ by the action of iron oxides (FeO, $Fe_2O_3$ etc.) in lower bath 13 to provide thermal energy to maintain the bath temperature. The off gases from lower Fe/FeO bath 13 at 149 bar exit through gas valve 16 for further processing. Molten Fe/FeO is transferred by differential pressure from lower Fe/FeO bath 13 to upper Fe/FeO bath 18 at 141 bar. Simultaneously, steam (3.6 lb/sec) is injected into the upper Fe/FeO bath 18 maintained at 2850° F. producing a high pressure stream of pure $H_2$ gas that exits through gas valve 21 (0.4 lb/sec) and enters a heat exchanger at a temperature of 1900° F. with the $H_2$ gas (1.1 lb/sec) separated from the processed gas stream exiting through gas valve 16. After heat reduction to 750° F., the $H_2$ is transferred through injection point 7 into carbon saturated molten Sn bath 8. The dissolved C is reduced by the $H_2$ gas producing $CH_4$ gas evolving into gas zone 10 that is maintained at a temperature of 750° F. and exits the reactor through gas valve 11.

The high purity high pressure $CH_4$ gas stream is produced continuously at a rate of 6.1 lb/sec. Saleable products are produced from the remaining off gases; 0.4 lb/sec of $SO_3$ and 8.1 lb/sec of $CO_2$.

Illustration V

High purity, high pressure syngas, (CO/$H_2$) is produced from Pittsburg 8 coal feedstock containing 73.2% carbon, 4.5% hydrogen, 5.2% oxygen, 2.4% sulfur, 6.1% water and 7.0% ash. The finely ground feedstock is bottom injected through injection point 1 into a 950° F. molten Sn bath 2 at a rate of 15 lb/sec. Thermal decomposition of the hydrocarbon feedstock results in a constant pressure of 150 bar in lower bath gas zone 4. Molten Sn/C containing dissolved carbon is transferred from lower Sn bath 2 to upper Sn bath 8 maintaining a reduced pressure of 135 bar in upper gas space 10. Slag removal as necessary is maintained through slag removal system 3. An additional 5.3 lb/sec of water and 8.3 lb/sec of oxygen gas is injected through injection point 7 into bath 8 for the oxidation of C (9.8 lb/sec) to CO. The combined off gases (CO, $H_2$, $H_2S$, $N_2$) transfer continuously through gas transfer control valve 6 through injection point 12 into the 2850° F. molten Fe/FeO bottom bath 13. The CO from the lower bath (2.8 lb/sec), is oxidized to $CO_2$ by the action of iron oxides (FeO, $Fe_2O_3$ etc.) in lower bath 13 to provide thermal energy to maintain the bath temperature. The off gases from lower Fe/FeO bath 13 at 150 bar exit through gas valve 16 for further processing. Molten Fe/FeO is transferred by differential pressure from lower Fe/FeO bath 13 to upper Fe/FeO bath 18 at 141 bar. Simultaneously, steam (2.4 lb/sec) is injected into the upper Fe/FeO bath 18 maintained at 2850° F. producing a high pressure stream of pure $H_2$ gas that exits through gas valve 21 (0.3 lb/sec).

The high purity high pressure syngas stream is produced continuously at a rate of 22.8 lb/sec of CO and 0.6 lb/sec of H2 gas and exited through gas transfer valve 11 where it is combined with 1.2 lb/sec of $H_2$ gas from gas transfer valve 21 and the purified $H_2$ gas stream produce from gas transfer valve 16. The saleable products produced from the remaining off gases (0.9 lb/sec of $SO_3$) are recovered as $H_2SO_4$ and 4.4 lb/sec of $CO_2$ and is transferred as a high purity, high pressure gas stream.

Illustration VI

High purity, high pressure hydrogen ($H_2$) gas is produced from petroleum coke feedstock containing 79.0% carbon, 3.6% hydrogen, 6.7% sulfur and 9.0% water and 0.4% ash. The finely ground feedstock (15 lb/sec) and 10.5 lb/sec of oxygen is bottom injected through injection point 1 into a 2850° F. molten Fe bath 2. Thermal decomposition of the hydrocarbon feedstock results in a constant pressure of 149 bar in lower bath gas zone 4. Molten Fe/FeO is transferred from lower Fe bath 2 to upper Fe bath 8 maintaining a reduced pressure of 141 bar in upper gas space 10. Slag removal as necessary is maintained through slag removal system 3. An additional 24.0 lb/sec of steam is injected through injection point 7 into bath 8 for the oxidation of Fe to FeO+$H_2$.

The high purity high pressure $H_2$ gas stream is produced continuously at a rate of 2.7 lb/sec and exited through gas transfer valve 11 where it is combined with 0.7 lb/sec of purified $H_2$ gas stream produced from gas transfer valve 16. The saleable products produced from the remaining off gases from gas transfer valve 16 after processing are 0.9 lb/sec of $SO_3$ recovered as $H_2SO_4$ and 43.4 lb/sec of $CO_2$ as a high purity, high pressure gas stream.

While this invention has been particularly shown and described with references to preferred embodiments thereof, it will be understood by those skilled in the art that various changes in form and details may be made therein without departing from the scope of the invention encompassed by the appended claims.

What is claimed is:

1. A process for making a high purity gas comprising the steps of:
   (a) adding a carbon-containing feed stream into a first bath vessel containing a first molten metal bath, wherein the first bath vessel is maintained at a pressure, P1, of at least 1 bar, and producing a first vessel gas stream comprising carbon monoxide and hydrogen sulfide;
   (b) removing the first vessel gas stream from the first bath vessel and introducing the first vessel gas stream into a third bath vessel containing a third molten metal bath, wherein the third bath vessel is maintained at a third pressure, P3, of at least 1 bar, optionally adding an oxygen source, such as steam or an oxygen containing feed, and producing a third vessel gas stream comprising hydrogen, $SO_3$ and carbon dioxide;
   (c) removing the third vessel gas stream from the third bath vessel, and optionally condensing the $SO_3$ therefrom and/or removing the carbon dioxide, thereby obtaining a purified hydrogen gas;
   (d) adding steam to a fourth bath vessel containing a fourth molten metal bath characterized by a low carbon content, wherein the fourth bath vessel is maintained at a fourth pressure, P4, of at least 1 bar, thereby producing additional purified hydrogen gas; and
   (e) adding one or more gas streams produced by step (c) and/or (d) to a second bath vessel containing a second molten metal bath maintained at a second pressure, P2, of at least 1 bar, and a temperature of less than about 800-1000° F., characterized by a high carbon content, wherein the one or more gas streams are a gas consisting of one or more gases produced by step (c), produced by step (d), and oxygen, thereby producing purified methane or carbon monoxide.

2. The method of claim 1 using a reactor system comprising:
   a reactor housing characterized by a housing temperature, T10, wherein the first bath vessel is contained within the reactor housing, and having a gas zone having a gas zone pressure, P10, disposed therebetween, and wherein the P10 is approximately the same as the P1, and the T10 is less than the T1;
   the second bath vessel disposed within the reactor housing and disposed above the first bath vessel, wherein a second bath vessel pressure in the second bath vessel, P2, is lower than the P1;
   a first conduit in fluid communication with the second bath vessel and the first bath vessel, whereby a pressure difference between the P1 and the P2 causes transfer of the first molten metal residing in said first bath vessel to said second bath vessel;
   a second conduit in fluid communication with the second bath vessel and the first bath vessel, whereby gravity causes transfer of the second molten metal residing in said second bath vessel to said first bath vessel;
   the third bath vessel capable of containing the third molten metal having a third bath temperature, T3, and a third bath pressure, P3;
   the fourth bath vessel capable of containing the fourth molten metal having a fourth bath temperature, T4, and a fourth bath vessel pressure, P4, disposed above said third bath vessel;
   a second reactor housing characterized by a second housing temperature, T11, wherein the third bath vessel is contained within the second reactor housing, and having a gas zone having a gas zone pressure, P11, disposed therebetween, and wherein the P11 is approximately the same as the P3 and the T11 is less than the T3;
   a third conduit in fluid communication with the third bath vessel and the fourth bath vessel, whereby a second pressure difference between the P3 and the P4 causes transfer of the third molten metal residing in said third bath vessel to said fourth bath vessel, and wherein the third conduit comprises an inlet disposed in a lower half of the third bath vessel and an outlet disposed in an upper half of the fourth bath vessel;
   a fourth conduit in fluid communication with the third bath vessel and the fourth bath vessel, whereby gravity causes transfer of the fourth molten metal residing in said fourth bath vessel to said third bath vessel, and wherein the fourth conduit comprises another inlet disposed in the lower half of the fourth bath vessel and an outlet disposed in the upper half of the third bath vessel; and
   wherein each bath vessel is characterized by a head space, and wherein the head space of the first bath vessel is in fluid communication with the third molten metal bath of the third bath vessel, and wherein the head space of the fourth bath vessel is in fluid communication with the second bath vessel.

3. The process of claim 1, wherein one or more molten metal baths are selected from a group consisting of iron, tin, lead, any combination thereof, and metal filings.

4. The process of using a reactor as set forth in claim 1 to convert the carbon-containing feed stream to one or more $H_2$, $CH_4$, CO or $CO_2$ gas streams from a hydrocarbon feedstock.

5. The process of claim 4, wherein the hydrocarbon feedstock comprises petroleum coke, coal, lignite coal, oil shale, natural gas or biomass.

6. The process of claim 4, wherein the hydrocarbon feedstock comprises liquid or gaseous hydrocarbons.

7. The process of claim 4, wherein the hydrocarbon feedstock comprises a waste material having a thermal content of at least about 4,000 BTU per pound.

8. The process of claim 4, wherein the hydrocarbon feedstock is added by auger extrusion, bottom or side injection, or by steam-cooled top lance injection.

9. The process of claim 4, wherein the pressure in at least one bath vessel is maintained at about 10 bar or more and/or less than about 600 bar.

10. The process of claim 4, wherein the reactor pressure is controlled based on adjusting an addition rate of the hydrocarbon feedstock, wherein a faster addition rate increases the reactor pressure more than a slower addition rate.

11. The process of claim 4, wherein molten metal is transferred between said first bath vessel and said second bath vessel and/or between said third bath vessel and said fourth bath vessel by maintaining a pressure differential greater than a pressure required to lift the molten metal and overcome resistance in metal transfer piping in a vertical and/or a diagonal direction.

12. The process of claim 1, further comprising a step of extracting mercury from any gas.

13. The process of claim 1, further comprising a step of extracting $SO_3$ by quenching with water to produce $H_2SO_4$.

14. The process of claim 1, further comprising a step of separating $H_2$ and $CO_2$ in the third vessel gas stream exiting the third bath vessel.

15. The process of claim 1, further comprising a step of forming a slag layer by addition of a flux, such as one or more oxides of Ca, Fe, K, Mg, Na, Si, Sn, and Ti.

16. The process of claim 1, comprising maintenance of relative pressures, such that the P1 is greater than the P3, and the P3 is greater than the P4, and the P4 is greater than the P2, thereby allowing transfer of gaseous materials between bath vessels in the absence of gas compression.

17. A method of claim 1, wherein each bath metal in a first of two vertically or horizontally aligned baths is an alloy of two or more metals comprising metals of sufficient oxidation potential to reduce water, and each bath metal in a second set of vertically or horizontally aligned metal baths comprises a same or different alloy of two or more metals taken from the list of reactive metals that includes antimony (Sb), Cobalt (Co), germanium (Ge), indium (In), molybdenum (Mo), lead (Pb) tungsten (W) and zinc (Zn) or other metals.

18. A method of claim 1, wherein each bath metal in a first of two vertically aligned baths is an alloy of two or more metals, wherein at least one metal is a less reactive metal that will not reduce water under bath conditions, and each bath metal in a second set of vertically aligned metal baths comprises a same or different alloy of two or more metals, wherein at least one metal is taken from the list of relatively unreactive metals that includes bismuth (Bi), cadmium (Cd), copper (Cu), gold (Au), iridium (Ir), mercury (Hg), nickel (Ni), osmium (Os), platinum (Pt), rhenium (Re), rhodium (Rh), ruthenium (Ru), selenium (Se) and tellurium (Te).

* * * * *